United States Patent Office 2,960,528
Patented Nov. 15, 1960

2,960,528
PREPARATION OF NEUTRAL PHOSPHATE ESTERS

Richard L. McConnell and Harry W. Coover, Jr., Kingsport, Tenn., assignors to Eastman Kodak Company, Rochester, N.Y., a corporation of New Jersey No Drawing. Filed Oct. 22, 1959, Ser. No. 847,888

6 Claims. (Cl. 260—461)

This invention relates to a novel process for the preparation of neutral phosphate esters. In a specific aspect, this invention relates to a novel process involving the reaction of an acid phosphate with a hydrogen phosphite in order to produce neutral phosphate esters.

Neutral phosphate esters have found wide utility as flameproofing plasticizing agents for resinous materials, such as cellulose esters and the like. In some instances, certain neutral phosphate esters have been found to be quite useful as solvents, oil additives and as intermediates for the preparation of other useful organophosphorus compounds. Prior to this invention, neutral phosphate esters were prepared by reacting an alcohol with phosphorus oxychloride and during the reaction, three moles of hydrogen chloride were produced for each mole of neutral phosphate. Since hydrogen chloride is extremely corrosive, it has been necessary to employ special equipment for this reaction. Also, the liberated hydrogen chloride tends to react with the neutral phosphate ester to produce acid phosphates and an alkyl halide and to reduce the yield of the desired neutral phosphate ester. It is an object of this invention to provide a novel process for the preparation of neutral phosphate esters. It is another object of this invention to prepare neutral phosphate esters by a novel process which eliminates the disadvantages of the prior art procedures for producing neutral phosphate esters. It is a further object of this invention to provide an inexpensive procedure for the preparation of neutral phosphate esters in comparatively high yields. Further and additional objects of this invention will be apparent from the detailed disclosure appearing herein.

In accordance with our invention, it has been found that neutral phosphate esters can be prepared by the reaction of an acid phosphate with a hydrogen phosphite. The reaction that takes place is illustrated by the following equation:

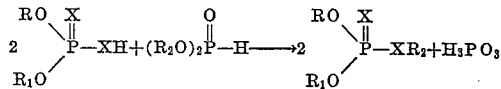

wherein X is selected from the group consisting of oxygen and sulfur, R and $R_1$ each represents a hydrocarbon selected from the group consisting of (a) monovalent alkyl radicals containing 1–8 carbon atoms and (b) divalent radicals wherein R and $R_1$ together represent an alkylene radical containing 1–8 carbon atoms and $R_2$ is a hydrocarbon radical selected from the group consisting of alkyl radicals containing 1–8 carbon atoms, phenyl and tolyl.

The operable temperature range for the practice of our invention is from 0–250° C. and preferably the temperature is within the range of 50–200° C. Suitable reaction periods vary from 2 to about 24 hours and although any molar ratio of reactants can be employed, it is preferable to employ the stoichiometric amounts shown in the above equation in order to obtain optimum yields.

The acid phosphates that are employed as reactants in our process can be prepared by the reaction of an alcohol with phosphorus pentoxide. The product of this reaction, particularly when a 1:3 molar ratio of phosphorus pentoxide to alcohol is employed, is an approximately equimolar mixture of the mono- and di-substituted phosphate. For example, when 2-ethylhexanol is reacted with phosphorus pentoxide in a 3:1 molar ratio, the resulting product contains bis(2-ethylhexyl)hydrogen phosphate and 2-ethylhexyl dihydrogen phosphate in substantially equimolar amounts. In our process, the mixture of mono- and di-substituted phosphates can be employed as reactants for our process. When this mixture of reactants is employed in our process, the reaction that takes place can be illustrated by the following equation:

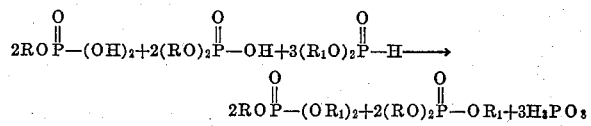

It is quite apparent that in practicing our invention it is possible to produce symmetrical and unsymmetrical neutral phosphate esters. The desired product can be readily obtained by the proper selection of the acid phosphate and the hydrogen phosphite that are employed as reactants in our process.

The following examples are illustrative of the reaction that takes place in practicing our invention.

EXAMPLE 1

*2,2-dimethyl-1,3-propanediol cyclic ethyl phosphate*

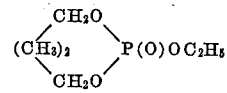

Diethyl hydrogen phosphite (0.1 mole) and 2,2-dimethyl-1,3-propanediol cyclic hydrogen phosphate (0.1 mole) were mixed and heated to 160–165° C. for 7 hours with stirring. The reaction mixture was treated with sodium carbonate and then distilled in vacuo through a short Vigreux column. The product was obtained in 75% yield and it was collected at 109–112° C. at 0.8 mm., $n_D^{20}$, 1.4358.

The same product was obtained in good yield when 0.05 mole of diethyl hydrogen phosphite was used rather than 0.1 mole as described above.

Similar results were obtained when 2,2-dimethyl-1,3-propanediol cyclic hydrogen phosphate was treated with dimethyl-, dibutyl-, diisobutyl-, bis-(2-ethylhexyl)-, bis-(2-ethyl-4-methylpentyl)-, bis-2,2-dimethylpentyl)-, or diphenyl hydrogen phosphites according to the above-described procedure.

EXAMPLE 2

*Diethyl 2-ethylhexyl phosphate and ethyl bis (2-ethylhexyl) phosphate*

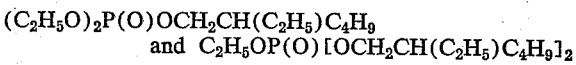

2-ethylhexanol (1.5 moles) was placed in a flask and stirred while $P_2O_5$ (0.5 mole) was added portionwise with stirring. The reaction was exothermic and was maintained below 85° C. by the rate of addition of the $P_2O_5$. After all of the $P_2O_5$ had been added, the reaction mixture was stirred at 85° C. for 3 hours. This crude product was a transparent oil and it contained approximately 55% by weight of bis(2-ethylhexyl)hydrogen phosphate and 43% 2-ethylhexyl dihydrogen phosphate.

This reaction product was treated with diethyl hydrogen phosphite (0.8 mole) and reacted at 160–170° C. for 8 hours with stirring. The crude reaction mixture was washed with water to remove liberated phosphorous acid. After drying the crude product over anhydrous sodium sulfate, the product was treated with 2–3 g. of anhydrous sodium carbonate and fractionated in vacuo. Diethyl 2-ethylhexyl phosphate was collected at 107–108° C. at 0.7 mm. ($n_D^{20}$ 1.4260) and ethyl bis(2-ethylhexyl) phosphate was collected at 168–170° C./0.7 mm. ($n_D^{20}$ 1.4336). Similar results were obtained when this crude mixture of 2-ethylhexyl phosphoric acid was treated with dimethyl, dibutyl, diisobutyl, bis-2-methylbutyl) or bis(2-ethyl-4-methylpentyl)hydrogen phosphites.

EXAMPLE 3

Tris(2-ethylhexyl)phosphate

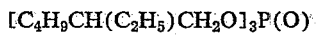

2-ethylhexanol (1.5 moles) and $P_2O_5$ (0.5 mole) were reacted to produce a mixture of mono- and bis-(2-ethylhexyl)phosphoric acids and this crude mixture was treated with bis(2-ethylhexyl) hydrogen phosphite (0.8 mole) according to the procedure of Example 2. The product was obtained in 81% yield and it distilled at 189–192° C. at 1.0 mm., $n_D^{20}$ 1.4433.

Similar results were obtained when a mixture of butyl phosphoric acids was treated with dibutyl hydrogen phosphite and when a mixture of ethyl phosphoric acids was treated with diethyl hydrogen phosphite.

EXAMPLE 4

2-ethyl-4-methylpentyl diphenyl phosphate and bis(2-ethyl-4-methylpentyl)phenyl phosphate

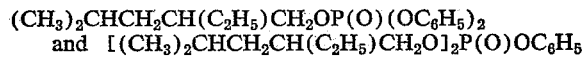

2-ethyl-4-methylpentanol (1.5 moles) and $P_2O_5$ (0.5 mole) were reacted and treated with diphenyl hydrogen phosphite (0.8 mole) according to the procedure described in Example 2. The products were isolated by fractionation in vacuo.

Similar results were obtained using ditolyl hydrogen phosphite.

EXAMPLE 5

Triethyl phosphate

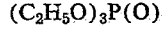

Diethyl hydrogen phosphate (0.5 mole) was treated with diethyl hydrogen phosphite (0.25 mole) according to the procedure of Example 1. Triethyl phosphate was obtained in 78% yield, B.P. 94–95° at 10 mm., $n_D^{20}$ 1.4053.

Similar results were obtained using dibutyl hydrogen phosphate and dibutyl hydrogen phosphite, diisobutyl hydrogen phosphate and diisobutyl hydrogen phosphite and diamyl hydrogen phosphate and diamyl hydrogen phosphite.

EXAMPLE 6

O,O-S-triethyl phosphorothiolothionate

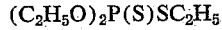

Diethyl phosphorothiolothionate (0.1 mole) and diethyl hydrogen phosphite (0.05 mole) were reacted according to the procedure of Example 1 except that the temperature was maintained at 115–125° C. The product was obtained in 85% yield and it distilled at 76° C. at 0.8 mm., $n_D^{20}$ 1.5040.

Similar results were obtained when dibutyl-, diisobutyl-, and bis(2-ethylhexyl)phosphorothiolothionate were treated with dimethyl-, diethyl-, dibutyl-, diisobutyl-, bis(2-ethylhexyl)- and diphenyl hydrogen phosphite. When the alcohol groups in the phosphorothiolothionate were different from those in the hydrogen phosphite, unsymmetrical neutral phosphorothiolothionates were formed.

Although the invention has been described in considerable detail with reference to certain preferred embodiments thereof, variations and modifications can be effected within the spirit and scope of this invention as described hereinabove and as defined in the appended claims.

We claim:

1. The method for producing neutral phosphate esters which comprises reacting an acid phosphate having the structural formula:

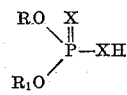

with a hydrogen phosphite having the structural formula:

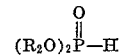

wherein X is selected from the group consisting of oxygen and sulfur, R and $R_1$ each represents a hydrocarbon selected from the group consisting of (a) monovalent alkyl radicals containing 1–8 carbon atoms and (b) divalent radicals wherein R and $R_1$ together represent an alkylene radical containing 1–8 carbon atoms and $R_2$ is a hydrocarbon radical selected from the group consisting of alkyl radicals containing 1–8 carbon atoms, phenyl and tolyl.

2. The method for producing 2,2-dimethyl-1,3-propanediol cyclic ethyl phosphate which comprises reacting diethyl hydrogen phosphite with 2,2-dimethyl-1,3-propanediol cyclic hydrogen phosphate at a temperature within the range of 0–250° C.

3. The method for producing diethyl 2-ethylhexyl phosphate and ethyl bis(2-ethylhexyl)phosphate which comprises reacting a substantially equimolar mixture of bis(2-ethylhexyl)hydrogen phosphate and 2-ethylhexyl dihydrogen phosphate with diethyl hydrogen phosphite at a temperature within the range of 0 to 250° C.

4. The method for producing tris(2-ethylhexyl)phosphate which comprises reacting a substantially equimolar mixture of bis(2-ethylhexyl)hydrogen phosphate and 2-ethylhexyl dihydrogen phosphate with bis(2-ethylhexyl) hydrogen phosphite at a temperature within the range of 0–250° C.

5. The method for producing 2-ethyl-4-methylphenyl diphenyl phosphate and bis(2-ethyl-4-methylpentyl) phenyl phosphate which comprises reacting a substantially equimolar mixture of bis(2-ethyl-4-methylpentyl)hydrogen phosphate and 2-ethyl-4-methylpentyl dihydrogen phosphate with diphenyl hydrogen phosphite at a temperature within the range of 0 to 250° C.

6. The method for producing triethyl phosphate which comprises reacting diethyl hydrogen phosphate with diethyl hydrogen phosphite at a temperature within the range of 0 to 250° C.

No references cited.